US012753375B2

(12) United States Patent
Kim et al.

(10) Patent No.: US 12,753,375 B2
(45) Date of Patent: Oct. 6, 2026

(54) MIXED HYDROCARBON INSULATING CLEANER COMPOSITION FOR HIGH-VOLTAGE ELECTRICITY AND ELECTRONIC COMMUNICATION EQUIPMENT WITHOUT POWER INTERRUPTION

(71) Applicant: NAUmade Co., Ltd., Seoul (KR)

(72) Inventors: Dal Moon Kim, Seoul (KR); Ryun Hyun Kim, Seoul (KR)

(73) Assignee: NAUmade Co., Ltd., Seoul (KR)

( * ) Notice: Subject to any disclaimer, the term of this patent is extended or adjusted under 35 U.S.C. 154(b) by 204 days.

(21) Appl. No.: 18/791,449

(22) Filed: Aug. 1, 2024

(65) Prior Publication Data

US 2024/0392219 A1 Nov. 28, 2024

Related U.S. Application Data

(63) Continuation of application No. PCT/KR2023/004520, filed on Apr. 4, 2023.

(30) Foreign Application Priority Data

Jan. 20, 2023 (KR) ........................ 10-2023-0008663

(51) Int. Cl.
*C11D 7/50* (2006.01)

(52) U.S. Cl.
CPC .................................. *C11D 7/5027* (2013.01)

(58) Field of Classification Search
CPC ... C11D 7/5027; C11D 7/5072; C11D 3/0026; C11D 3/181; C11D 9/24; C11D 2111/22
See application file for complete search history.

(56) References Cited

U.S. PATENT DOCUMENTS 3,884,759 A * 5/1975 Nakao ..................... C12P 33/00 435/945
4,180,472 A * 12/1979 Mitchell .................. C11D 3/43 134/40
5,004,502 A * 4/1991 Ramzan .................. C08L 83/04 106/901
5,597,792 A * 1/1997 Klier .................. C11D 17/0021 510/432
6,150,318 A * 11/2000 Silvester .................. C11D 3/18 510/417
2005/0027148 A1* 2/2005 Connor ..................... C10L 1/08 585/14
2017/0100316 A1* 4/2017 Dickhof ................. A61K 8/342
2020/0170912 A1* 6/2020 Krohn ...................... A61K 8/31

FOREIGN PATENT DOCUMENTS

| | | | |
|---|---|---|---|
| EP | 0529869 | A1 | 3/1993 |
| JP | H02173096 | A | 7/1990 |
| JP | H05263099 | A | 10/1993 |
| JP | H06293898 | A | 10/1994 |
| KR | 10-1487239 | B1 | 2/2015 |
| KR | 10-1959815 | B1 | 3/2019 |
| KR | 10-2022-0073218 | A | 6/2022 |
| KR | 10-2474553 | B1 | 12/2022 |

OTHER PUBLICATIONS

Notice of Reasons for Rejection of Japanese Patent Application No. 2024-544537 dated Aug. 5, 2025.
European Patent Office, Extended European Search Report for European Patent Application No. 23917821.3, Apr. 28, 2025.

* cited by examiner

*Primary Examiner* — Charles I Boyer
(74) *Attorney, Agent, or Firm* — NKL LAW; Jae Youn Kim

(57) ABSTRACT

Provided is an insulation cleaner composition that increases the dielectric breakdown voltage and ignition point while maintaining natural volatile function at the same level as the conventional one. One embodiment of the present invention provides an insulation cleaning composition containing n-Undecane; n-Dodecane; and n-Tridecane. The total sum of the contents of the n-Undecane, n-Dodecane, and n-Tridecane is 87 wt % or more based on the total weight of the insulation cleaning composition.

7 Claims, No Drawings

MIXED HYDROCARBON INSULATING CLEANER COMPOSITION FOR HIGH-VOLTAGE ELECTRICITY AND ELECTRONIC COMMUNICATION EQUIPMENT WITHOUT POWER INTERRUPTION

TECHNICAL FIELD

The present invention relates to an insulation cleaner composition, and more specifically, to an insulation cleaner composition for electrical fire prevention that can be used in high-voltage electrical and electronic communication equipment with power on.

BACKGROUND ART

Conventional insulation cleaner compositions are prepared by mixing inorganic salts and surfactants, but their range of use has been extremely limited due to their limited cleaning function. In the case of semi-solid dirt-cleaning detergents, most of them are blended with frictional substances that have high hardness when used by adding frictional substances to ingredients with cleaning ability, but these detergents had problems in that, when the frequency of use was high, the surface of the objects to be cleaned was worn and damaged, and the accuracy of the mechanical device was lowered.

Meanwhile, the most representative electrical equipment device is a switchboard. The switchboard is equipment installed and used indoors or outdoors in buildings or substations that use a lot of electricity, and also is an electrical device that manages various switches, instruments, relays, and the like by arranging them in a consistent manner. The switchboard is equipped with an operating lever for opening and closing the breaker of the high-voltage main circuit, a switchgear of the low-voltage main circuit, a voltmeter, an ammeter, a wattmeter, an integrated wattmeter, a current relay, and the like, and a high-voltage current flows therein.

Recently, in order to improve efficiency by operating production lines or management lines 24 hours a day in companies, although it is preferred that the cleaning process be performed in an uninterrupted state (power on) using a detergent with improved insulation, there has been a problem in recent years where it has been difficult to sufficiently increase the dielectric breakdown voltage, which is the most important safety factor in the cleaning work conditions required by companies.

DISCLOSURE

Technical Problem

An object of the present invention is to provide an insulation cleaner composition that increases the dielectric breakdown voltage while maintaining natural volatilization performance at a level equivalent to that of the related art.

Another object of the present invention is to provide an insulation cleaner composition that is capable of preventing fires by increasing the ignition point.

Still another object of the present invention is to provide an insulation cleaner composition that is environmentally friendly as it does not contain ozone-depleting substances, and is capable of cleaning an electrical panel (high voltage/low voltage), electronic equipment, communication equipment, and high-performance control equipment in a non-stop manner without power interruption.

Yet another object of the present invention is to provide an insulation cleaner composition that contains non-oxidizing substances to prevent damage to electronic components due to cleaning and does not leave a residue after being naturally evaporated after cleaning.

Yet another object of the present invention is to provide an insulation cleaner composition that contains non-corrosive substances and may effectively prevent corrosion of objects to be cleaned.

The objects of the present invention are not limited to the above-mentioned objects, and other objects and advantages of the present invention not mentioned above can be understood by the following description and will be more clearly understood by the examples of the present invention. It will also be readily apparent that the objects and advantages of the present invention may be realized by the means and combinations thereof set forth in the claims.

Technical Solution

According to a first aspect of the present invention for achieving the above object, there is provided a insulation cleaner composition, which includes n-undecane, n-dodecane, and n-tridecane, wherein a total sum of the contents of the n-undecane, the n-dodecane, and the n-tridecane is 87% by weight or more based on the total weight of the insulation cleaner composition.

According to a second aspect of the present invention, the insulation cleaner composition of the first aspect may include 30 to 45% by weight of the n-undecane, 28 to 35% by weight of the n-dodecane, and 20 to 27% by weight of the n-tridecane. Here, the total sum of the contents of the n-undecane, the n-dodecane, and the n-tridecane may be 87% by weight or more based on the total weight of the insulation cleaner composition.

According to a third aspect of the present invention, the insulation cleaner composition of the first or second aspect may further include 6 to 13% by weight of n-decane.

According to a fourth aspect of the present invention, the insulation cleaner composition of any one of the first to third aspects may further include 0.10 to 4.00% by weight of n-tetradecane.

According to a fifth aspect of the present invention, the insulation cleaner composition of any one of the first to fourth aspects may not include n-nonane.

According to a sixth aspect of the present invention, a dielectric breakdown voltage of the insulation cleaner composition of any one of the first to fifth aspects may be 100 kV or more based on the KS C IEC 60156:2003 test standard.

According to a seventh aspect of the present invention, an ignition point of the insulation cleaner composition of any one of the first to sixth aspects may be 230° C. or higher based on the ASTM E-659 test standard.

According to an eighth aspect of the present invention, the insulation cleaner composition of any one of the first to seventh aspects may further include an additive.

According to a ninth aspect of the present invention, the additive of the eighth aspect may include one selected from the group consisting of isopropyl alcohol, 1,1-difluoroethane, 1,1,1,2-tetrafluoroethane, and pentafluoroethane, or a mixture of two or more thereof.

The means for solving the above problems do not enumerate all the features of the present invention. The various features of the present invention and its advantages and effects may be understood in more detail by referring to the specific examples below.

Advantageous Effects

According to one aspect of the invention, an insulation cleaner composition not only can increase the dielectric breakdown voltage and maintain natural volatilization performance at a level equivalent to that of the related art through the combination of the optimal carbon number of the specific individual compounds that constitute paraffinic hydrocarbons, but can also prevent fires by increasing the ignition point.

According to another aspect of the present invention, an insulation cleaner composition is environmentally friendly as it does not contain ozone-destructing substances, and can clean an electrical panel (high voltage/low voltage), electronic equipment, communication equipment, and high-performance control equipment in a non-stop manner without power interruption.

According to still another aspect of the present invention, it is possible to implement an insulation cleaner composition that contains non-oxidizing substances to prevent damage to electronic components due to cleaning and does not leave a residue after being naturally evaporated after cleaning.

According to yet another aspect of the present invention, it is possible to implement an insulation cleaner composition that can effectively prevent corrosion of objects to be cleaned.

In addition to the above-described effects, specific effects of the present invention will be described together while describing specific details for carrying out the invention below.

BEST MODE FOR IMPLEMENTATION OF THE INVENTION

The range of values expressed using the term 'to' in this specification indicates a range of values that include the values described before and after the term as the lower limit and upper limit, respectively. When multiple numerical values are disclosed as the upper and lower limits of an arbitrary numerical range, respectively, the numerical range disclosed in this specification may be understood as an arbitrary numerical range in which any one of a plurality of lower limit values and any one of a plurality of upper limit values are set as the lower limit and the upper limit, respectively.

1. Insulation Cleaner Composition

One embodiment of the present invention provides an insulation cleaner composition including n-undecane, n-dodecane, and n-tridecane, wherein a total sum of the contents of the n-undecane, the n-dodecane, and the n-tridecane is 87% by weight or more based on the total weight of the insulation cleaner composition.

The related art simply used paraffinic hydrocarbons to improve the dielectric breakdown voltage, flash point, and natural evaporation performance in insulation cleaner compositions, and no attempt has been made to maximize the dielectric breakdown voltage and at the same time increase the ignition point by combining the optimal carbon number of the specific individual compounds that constitute paraffinic hydrocarbons. In addition, insulation cleaner compositions containing a paraffinic hydrocarbon having 10 to 12 carbon atoms as a main ingredient have the problem of not sufficiently increasing the dielectric breakdown voltage.

Meanwhile, the flash point is the lowest temperature at which a combustible substance can be ignited in the air, while the ignition point is the lowest temperature at which the substance ignites spontaneously and starts burning when heated in the air. In the technical field of insulation cleaner compositions, the flash point has been mainly evaluated, but since the flash point is artificially measured using a flame, it may not be an evaluation criterion that can clearly measure the occurrence of fires. On the other hand, because the ignition point is the temperature at which a fire ignites spontaneously without an artificial flame, it may be an objective evaluation criterion that can clearly measure the occurrence of fires. According to one aspect of the invention, by including 30 to 45% by weight of n-undecane; 28 to 35% by weight of n-dodecane; and 20 to 27% by weight of n-tridecane, the insulation cleaner composition not only may increase the dielectric breakdown voltage and maintain natural volatilization performance at a level equivalent to that of the related art through the combination of the optimal carbon number of the specific individual compounds that constitute paraffinic hydrocarbons, but may also prevent fires by increasing the ignition point. According to another aspect of the present invention, the dielectric breakdown voltage of the insulation cleaner composition may be significantly increased by using n-paraffin-based hydrocarbons, which have a relatively larger molecular surface area than branched paraffin-based hydrocarbons. According to still another aspect of the present invention, through the combination of the optimal carbon number of the specific individual compounds that constitute paraffinic hydrocarbons, it is possible to implement an insulation cleaner composition that is environmentally friendly as it does not contain ozone-destructing substances, and may clean an electrical panel (high voltage/low voltage), electronic equipment, communication equipment, and high-performance control equipment in a non-stop manner without power interruption. According to yet another aspect of the present invention, through the combination of the optimal carbon number of the specific individual compounds that constitute paraffinic hydrocarbons, it is possible to implement an insulating cleaner composition that contains non-oxidizing substances to prevent damage to electronic components due to cleaning and does not leave a residue after being naturally evaporated after cleaning. According to yet another aspect of the present invention, through the combination of the optimal carbon number of the specific individual compounds that constitute paraffinic hydrocarbons, it is possible to implement an insulating cleaning composition that may effectively prevent corrosion of objects to be cleaned.

Hereinafter, the configuration of the present invention will be described in more detail.

The insulation cleaner composition according to one aspect of the present invention may include a paraffinic hydrocarbon to simultaneously increase the dielectric breakdown voltage, ignition point, and natural evaporation performance. According to another aspect of the present invention, the paraffinic hydrocarbon may effectively clean dust and fine dust.

Meanwhile, paraffinic hydrocarbons are also simply called paraffins, and classified into an n-paraffins (straight chain paraffins), in which all the carbon atoms are connected and arranged in a row, and isoparaffins, which have branches in the carbon chain. The paraffinic hydrocarbon may be classified into various types, such as methane (n=1), ethane (n=2), propane (n=3), butane (n=4), pentane (n=5), hexane (n=6), heptane (n=7), octane (n=8), nonane (n=9), decane (n=10), undecane (n=11), dodecane (n=12), tridecane (n=13), tetradecane (n=14), pentadecane (n=15), hexadecane (n=16), and the like, depending on the number n of carbon atoms contained. Low-grade methane, ethane, and propane are gases and present as components of natural gas or petroleum gas. Also, higher-grade n-paraffins ranging from pentane (n=5) to hexadecane (n=16) are liquid, and even-higher-grade n-paraffins are solid. Isoparaffins tend to have lower boiling points and lower melting points than n-paraffins with the same number of carbon atoms. Low-grade ones become fuel gas, and among the liquid ones, those with low boiling points may be used as gasoline components.

The insulation cleaner composition according to the present invention includes n-undecane with a carbon number of 11 to simultaneously increase the dielectric breakdown voltage, ignition point, and natural evaporation performance. According to one aspect of the present invention, n-undecane may effectively prevent the occurrence of fires by significantly increasing the dielectric breakdown voltage of an insulation cleaner composition compared to the branched paraffinic hydrocarbon with the same number of carbon atoms and simultaneously increasing the ignition point.

Specifically, the content of n-undecane may be 30 to 45% by weight, 30 to 40% by weight, 30 to 38% by weight, 30 to 36% by weight, 30 to 34% by weight, or 30 to 32% by weight, based on the total weight of the insulation cleaner composition. When the content of n-undecane is less than the above numerical range, problems may arise in which the dielectric breakdown voltage and ignition point are not sufficiently high, and when the content exceeds the above numerical range, the viscosity of the insulation cleaner composition increases excessively, resulting in reduced natural evaporation performance, which may cause a problem of a residue remaining after cleaning.

The insulation cleaner composition according to the present invention include n-dodecane with a carbon number of 12 to simultaneously increase the dielectric breakdown voltage, ignition point, and natural evaporation performance. According to one aspect of the present invention, n-dodecane may effectively prevent the occurrence of fires by significantly increasing the dielectric breakdown voltage of an insulation cleaner composition compared to the branched paraffinic hydrocarbon with the same number of carbon atoms and simultaneously increasing the ignition point.

Specifically, the content of n-dodecane may be 28 to 35% by weight, 29 to 34% by weight, 30 to 34% by weight, or 30 to 33% by weight, based on the total weight of the insulation cleaner composition. When the content of n-dodecane is less than the above numerical range, problems may arise in which the dielectric breakdown voltage and ignition point are not sufficiently high, and when the content exceeds the above numerical range, the viscosity of the insulation cleaner composition increases excessively, resulting in reduced natural evaporation performance, which may cause a problem of a residue remaining after cleaning.

The insulation cleaner composition according to the present invention include n-tridecane with a carbon number of 13 to simultaneously increase the dielectric breakdown voltage, ignition point, and natural evaporation performance. According to one aspect of the present invention, n-tridecane may effectively prevent the occurrence of fires by significantly increasing the dielectric breakdown voltage of an insulation cleaner composition compared to the branched paraffinic hydrocarbon with the same number of carbon atoms and simultaneously increasing the ignition point.

Specifically, the content of n-tridecane may be 20 to 27% by weight, 21 to 27% by weight, 22 to 27% by weight, 23 to 27% by weight, or 24 to 27% by weight, based on the total weight of the insulation cleaner composition. When the content of n-tridecane is less than the above numerical range, problems may arise in which the dielectric breakdown voltage and ignition point are not sufficiently high, and when the content exceeds the above numerical range, the viscosity of the insulation cleaner composition increases excessively, resulting in reduced natural evaporation performance, which may cause a problem of a residue remaining after cleaning.

According to one embodiment of the present invention, the total sum of the contents of n-undecane, n-dodecane and n-tridecane may be 87% by weight or more, 87 to 92% by weight, 87 to 91% by weight, or 87 to 90% by weight, based on the total weight of the insulation cleaner composition. When the total sum of the contents of n-undecane, n-dodecane, and n-tridecane satisfies the above numerical range, the insulation cleaner composition not only may increase the dielectric breakdown voltage and maintain natural volatilization performance at a level equivalent to that of the related art, but may also prevent fires by increasing the ignition point.

The insulation cleaner composition according to the present invention may further include n-decane with a carbon number of 10 to simultaneously increase the dielectric breakdown voltage, ignition point, and natural evaporation performance.

Specifically, the content of n-decane may be 6 to 13% by weight, 6 to 12% by weight, 6 to 11% by weight, 7 to 10% by weight, or 8 to 10% by weight, based on the total weight of the insulation cleaner composition. When the content of n-decane is less than the above numerical range, problems may arise in which the dielectric breakdown voltage and ignition point are not sufficiently high, and when the content exceeds the above numerical range, the problem of low cleaning power may occur.

The insulation cleaner composition according to the present invention may further include n-tetradecane with a carbon number of 14 to simultaneously increase the dielectric breakdown voltage, ignition point, and natural evaporation performance. According to one aspect of the present invention, n-tetradecane may effectively prevent the occurrence of fires by significantly increasing the dielectric breakdown voltage of an insulation cleaner composition compared to the branched paraffinic hydrocarbon with the same number of carbon atoms and simultaneously increasing the ignition point.

Specifically, the content of n-tetradecane may be 0.10 to 4.00% by weight, 0.20 to 3.50% by weight, 0.20 to 3.10% by weight, 0.30 to 3.10% by weight, 0.40 to 3.10% by weight, 0.50 to 3.10% by weight, or 0.60 to 3.10% by weight, based on the total weight of the insulation cleaner composition. Specifically, when the content of n-tetradecane is less than the above numerical range, problems may arise in which the dielectric breakdown voltage and ignition point are not sufficiently high, and when the content exceeds the above numerical range, the viscosity of the insulation cleaner composition increases excessively, resulting in reduced natural evaporation performance, which may cause a problem of a residue remaining after cleaning.

According to another embodiment of the present invention, the insulation cleaner composition may not include n-nonane with a carbon number of 9. Since the insulation cleaner composition does not include n-nonane, cleaning efficiency may be improved by appropriately controlling the volatilization rate of the insulation cleaner composition.

According to one embodiment of the present invention, a dielectric breakdown voltage of the insulation cleaner composition may be 98.7 kV or more or 100 kV or more based on the KS C IEC 60156:2003 test standard. When the dielectric breakdown voltage of the insulation cleaner composition satisfies the above numerical range, a suitable switchboard environment may be implemented and fires may be effectively prevented.

According to one embodiment of the present invention, based on the ASTM E-659 test standard, the ignition point of the insulation cleaner composition may be 230° C. or higher or 230 to 240° C. Meanwhile, the flash point is the lowest temperature at which a combustible substance can be ignited in the air, while the ignition point is the lowest temperature at which the substance ignites spontaneously and starts burning when heated in the air. In the technical field of insulation cleaner compositions, the flash point has been mainly evaluated, but since the flash point is artificially measured using a flame, it may not be an evaluation criterion that can clearly measure the occurrence of fires. On the other hand, because the ignition point is the temperature at which a fire ignites spontaneously without an artificial flame, it may be an objective evaluation criterion that can clearly measure the occurrence of fires. When the ignition point of the insulation cleaner composition is within the above numerical range, the occurrence of fires may be effectively prevented.

As needed, the insulation cleaner composition according to the present invention may further include additives to enhance various performances of the insulation cleaner composition. For example, the content of the additive may be 1.0% by weight or less, 0.8% by weight or less, 0.5% by weight or less, 0.4% by weight or less, 0.3% by weight or less, 0.2% by weight or less, 0.1% by weight or less, or 0.01 to 0.10% by weight, based on the total weight of the insulation cleaner composition.

For example, the additive may include one selected from the group consisting of isopropyl alcohol, 1,1-difluoroethane, 1,1,1,2-tetrafluoroethane, and pentafluoroethane, or a mixture of two or more thereof. First, isopropyl alcohol is a low-cost alcohol and may be added to lower the viscosity of the insulation cleaner composition. Next, since 1,1-difluoroethane is mixed with the paraffinic hydrocarbons to improve cleaning power and plays a role in lowering the pressure in the process of preparing the composition, so it can also play a role in reducing preparation costs because there is no need to form thick mixing and storage containers. Next, 1,1,1,2-tetrafluoroethane may be mixed with the paraffinic hydrocarbons and added to further enhance the cleaning power of the insulation cleaner composition. Next, pentafluoroethane is a colorless and odorless highly volatile compound and causes the insulation cleaner composition to evaporate quickly after cleaning, thereby preventing the cleaner from remaining on the surface of objects to be cleaned.

The insulation cleaner composition according to the present invention may be in a solution state in which all components are uniformly mixed. Specifically, by forming a solution state in which the insulation cleaner composition is uniformly mixed, the advantages of easy preparation, convenient carrying and storage, and easy mixing with additives may be realized. Specifically, since the individual paraffin-based compounds that constitute the insulation cleaner composition are filled into a container without a separate stirring process, the insulation cleaner composition may be easily prepared.

2. Application of Insulation Cleaner Composition

The insulation cleaner composition according to one embodiment of the present invention may effectively clean dust and fine dust in electrical power equipment where it is difficult to turn off the power. For example, the insulation cleaner composition can be used to clean an extra high voltage (22.9 kV-220 kV) switchboard, a high voltage (3.3 kV-6.6 kV) switchboard, a VCB panel, a low voltage (380 V-440 V) panel, an ACB & MCCB panel, a control panel, PLC, a switch panel, an electric car resistor, a filter reactor, a vehicle switchboard, or the like.

Hereinafter, examples of the present invention will be described in more detail so that those skilled in the art can easily practice it, but this is only one example, and the scope of the present invention is not limited thereto.

Preparation Example 1: Preparation of Insulation Cleaner Composition

An insulation cleaner composition was prepared with the composition according to Table 1 below. Each composition included in the insulation cleaner composition was analyzed by gas chromatography-mass spectrometry (GC-MS).

TABLE 1

| Units: wt % | | Comparative Example 1 | Comparative Example 2 | Comparative Example 3 | Example 1 |
|---|---|---|---|---|---|
| n-paraffins | n-$C_9H_{20}$ | 0.43 | 13 | — | — |
| | n-$C_{10}H_{22}$ | 13.53 | 20 | — | 9.90 |
| | n-$C_{11}H_{24}$ | 86.04 | 26 | 75.51 | 87 |
| | n-$C_{12}H_{26}$ | | | | |
| | n-$C_{13}H_{28}$ | | | | |
| | n-$C_{14}H_{30}$ | — | — | 24.31 | 3.10 |
| | n-$C_{15}H_{32}$ | — | — | 0.18 | |
| 1,1-difluoroethane | | — | 41 | — | — |
| Total sum | | 100 | 100 | 100 | 100 |

Experimental Example 1: Evaluation of Insulation Cleaner Composition

The dielectric breakdown voltage, ignition point, dryness, specific gravity, corrosive sulfur, acid number, and water performance of the insulation cleaner composition of Preparation Example 1 were evaluated using the following measurement methods.

1) Dielectric Breakdown Voltage

The dielectric breakdown voltage of the insulation cleaner composition of Preparation Example 1 was measured based on the KS C IEC 60156:2003 test standard (measurement conditions: 25° C. and 2.5 mm). Meanwhile, when the electric field applied to an insulating material becomes large and reaches a certain value, a high current suddenly flows and the material acts like a conductor, which is called dielectric breakdown. In this case, the voltage that causes dielectric breakdown is called dielectric breakdown voltage. The higher the dielectric breakdown voltage, the better the performance required to clean an electrical switchboard in an uninterrupted state without power interruption.

2) Ignition Point

The ignition point is the lowest temperature at which a substance ignites spontaneously and starts burning when heated in air, and refers to the temperature at which the vapor of a volatile liquid begins to burn in the presence of something that could ignite. The ignition point (° C.) of the insulation cleaner composition of Preparation Example 1 was measured according to ASTM E-659, and the higher the ignition point, the lower the risk of ignition.

3) Dryness

The dryness of the insulation cleaner composition of Preparation Example 1 was evaluated under measurement conditions (23° C. and 4 hours) according to the KS M 2109:2020 test standard. Specifically, when the object to be cleaned is in a non-adhesive state, it means that the dryness is excellent.

4) Specific Gravity

The specific gravity of the insulation cleaner composition of Preparation Example 1 was evaluated according to the ASTM D-1298 test standard.

5) Corrosive Sulfur

When a test switchboard was washed with the insulation cleaner composition of Preparation Example 1, corrosion of the test switchboard was evaluated according to the KS C 2101:2017 test standard. The corrosive sulfur evaluation was conducted under measurement conditions of 140° C. and 19 hours.

6) Acid Number

The acid number of the insulation cleaner composition of Preparation Example 1 was measured according to the KS C 2101:2017 test standard. The acid number is the content of acid included in the insulation cleaner composition of Preparation Example 1, and is an amount of alkali (mg KOH) required to neutralize the acid. The lower the amount of alkali, the less alkali is needed to neutralize the acid included in the insulation cleaner composition, which may mean that emulsion stability of the insulation cleaner composition is excellent.

7) Water

After the insulation cleaner composition of Preparation Example 1 was sprayed on the test switchboard, the content of water remaining in the switchboard was measured according to the KS C 2101:2017 test standard (K-F coulometric titration method). The lower the water content, the better the natural volatilization performance of the insulation cleaner composition of Preparation Example 1 after cleaning.

TABLE 2

| Classification | Comparative Example 1 | Comparative Example 2 | Example 3 |
|---|---|---|---|
| Dielectric breakdown voltage (kV) | 76.8 | 79.1 | 100 or more |
| Ignition point (° C.) | 215 | 230 | 230 |
| Dryness | Non-adhesive state | Non-adhesive state | Non-adhesive state |
| Specific gravity (15/4° C.) | 0.7455 | 0.7507 | 0.7503 |
| Corrosive sulfur | Non-corrosive | Non-corrosive | Non-corrosive |
| Acid number (mg KOH/g) | Less than 0.01 | Less than 0.01 | Less than 0.01 |
| Water [(m/m) %] | 0.0051 | 0.0056 | 0.0010 |

When comparing Comparative Examples 1 and 2 and Example 1 in terms of the content and carbon number of individual compounds constituting n-paraffins in Table 2, by satisfying that the total sum of the contents of n-undecane, n-dodecane and n-tridecane is 87% by weight or more based on the total weight of the insulation cleaner composition, it can be confirmed that the dielectric breakdown voltage may reach 100 kV or more, so the insulation of the insulator may not be effectively destroyed, and the water content remaining in the switchboard is significantly low, resulting in excellent natural volatilization performance.

In addition, when comparing Comparative Example 1 and Example 1 in terms of the content and carbon number of individual compounds constituting n-paraffin, by satisfying that the total sum of the contents of n-undecane, n-dodecane and n-tridecane is 87% by weight or more based on the total weight of the insulation cleaner composition, it can be inferred that the increased ignition point can effectively prevent the occurrence of fires.

Experimental Example 2: Measurement of Viscosity of Insulation Cleaner Composition The kinematic viscosity at 40° C. of the insulation cleaner compositions according to Comparative Examples 1 to 3 and Example 1 was measured in accordance with the ASTM D445 test standard.

TABLE 3

| Classification | Comparative Example 1 | Comparative Example 2 | Comparative Example 3 | Example 1 |
|---|---|---|---|---|
| Kinematic viscosity at 40° C. (cSt) | 1.2 | 1.44 | 1.73 | 1.38 |

When comparing Comparative Example 3 and Example 1 in terms of the content and carbon number of individual compounds constituting n-paraffins in Table 3, in Comparative Example 3, as the content of n-paraffins with carbon numbers of 13 and 14 increases, the kinematic viscosity of the insulation cleaner composition increases excessively, which may reduce natural evaporation performance and cause a problem of a residue remaining after cleaning. On the other hand, Example 1 may have excellent natural evaporation performance due to a lower kinematic viscosity compared to Comparative Example 3, and thus no residue may remain after cleaning.

Although preferred embodiments of the present invention have been described in detail, the scope of the rights of the present invention is not limited thereto, and various modifications and improvements made by those skilled in the art using the basic concept of the present invention defined in the following claims also fall within the scope of the present invention.

The invention claimed is:

1. An insulation cleaner composition comprising:

30 to 45% by weight of n-undecane;

28 to 35% by weight of n-dodecane;

20 to 27% by weight of n-tridecane; and 6 to 13% by weight of n-decane, wherein a total sum of contents of the n-undecane, the n-dodecane, and the n-tridecane is 87% by weight or more based on the total weight of the insulation cleaner composition.

2. The insulation cleaner composition of claim 1, further comprising 0.10 to 4.00% by weight of n-tetradecane.

3. The insulation cleaner composition of claim 1, comprising no n-nonane.

4. The insulation cleaner composition of claim 1, wherein a dielectric breakdown voltage of the insulation cleaner composition is 100 kV or more based on the KS C IEC 60156:2003 test standard.

5. The insulation cleaner composition of claim 1, wherein an ignition point of the insulation cleaner composition is 230° C. or higher based on the ASTM E-659 test standard.

6. The insulation cleaner composition of claim 1 further comprising an additive.

7. The insulation cleaner composition of claim 6, wherein the additive includes one selected from the group consisting of isopropyl alcohol, 1,1-difluoroethane, 1,1,1,2-tetrafluoroethane, and pentafluoroethane, or a mixture of two or more thereof.

* * * * *